United States Patent
Johnston

[19]

[11] Patent Number: 5,774,042
[45] Date of Patent: Jun. 30, 1998

[54] DEVICE FOR PROVIDING TACTILE INDICATION OF PEDAL POSITION

[75] Inventor: David J. Johnston, Portland, Oreg.

[73] Assignee: Williams Control Industries, Inc., Portland, Oreg.

[21] Appl. No.: 628,003

[22] Filed: Apr. 4, 1996

[51] Int. Cl.[6] ........................................................ H04B 3/36
[52] U.S. Cl. ................................. 340/407.1; 340/829.19; 340/965; 200/86.5; 200/61.89
[58] Field of Search ............................ 340/407.1, 825.19, 340/965; 200/86.5, 61.89; 434/112–114

[56] References Cited

U.S. PATENT DOCUMENTS

| | | | |
|---|---|---|---|
| 3,984,708 | 10/1976 | Holmlund et al. | 340/407.1 |
| 4,191,945 | 3/1980 | Hannen et al. | 340/407.1 |
| 4,354,071 | 10/1982 | Pietschmann | 200/86.5 |

Primary Examiner—Donnie L. Crosland
Attorney, Agent, or Firm—Tung & Associates

[57] ABSTRACT

A device for providing a pedal operator with tactile indication that a pedal (32) has been depressed to a preselected position includes a cup-like housing (50), a ring-shaped magnet (52) mounted within the housing (50) and a displaceable member (54) provided with a pin (56) engageable by the pedal (32). The pin (56) extends through aligned openings in the magnet (52) and housing (50) and mounts the displaceable member (54) for linear sliding movement on the housing (50). Depression of the pedal (32) to the preselected position results in shifting of the displaceable member (54) away from the influence of the magnet (52) to provide the operator with a snap-like tactile indication of pedal position. The cup (50), magnet (52) and displaceable member (54) are each made of unitary, one-piece construction and of simple, circular geometry.

25 Claims, 3 Drawing Sheets

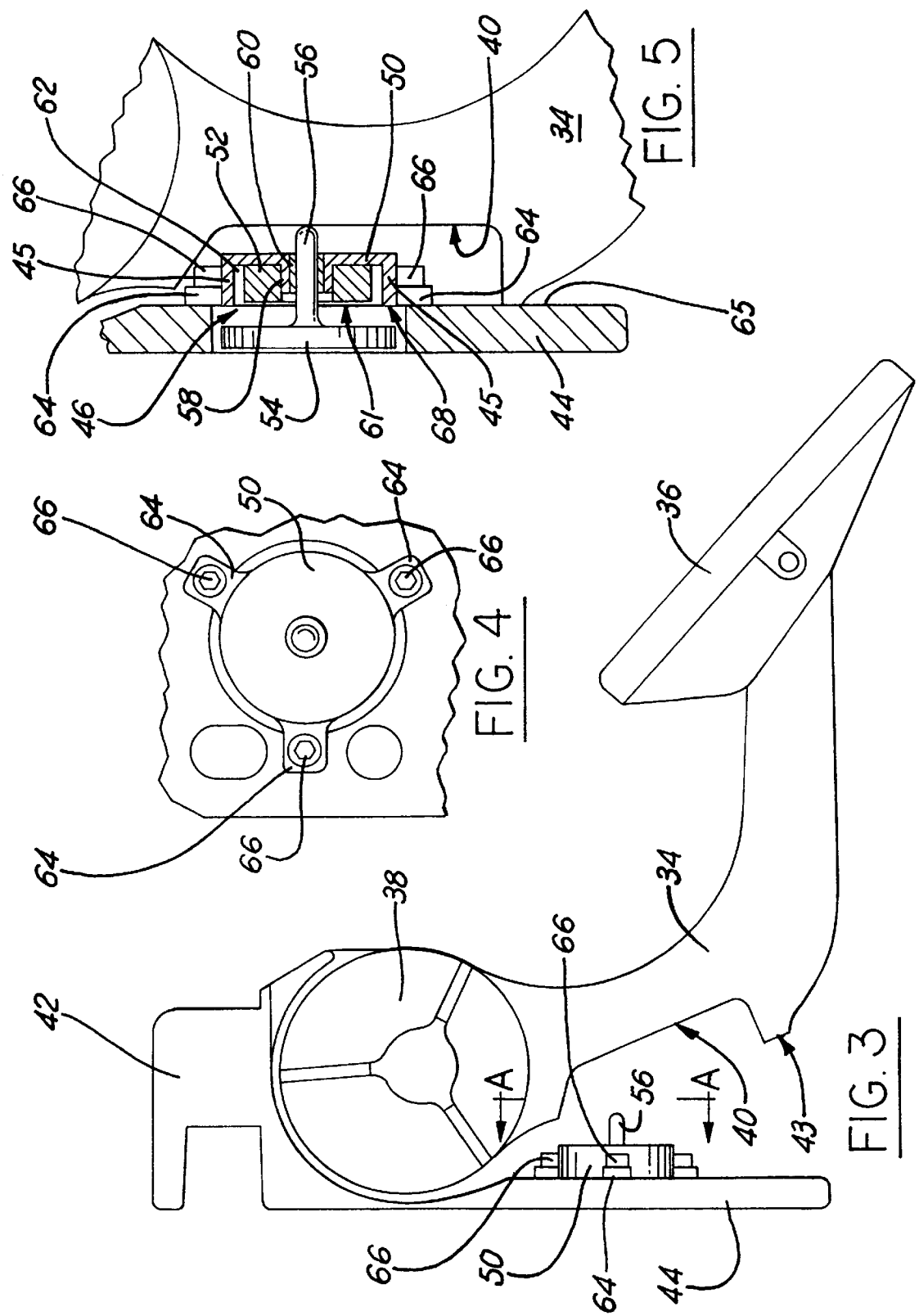

DEVICE FOR PROVIDING TACTILE INDICATION OF PEDAL POSITION

TECHNICAL FIELD

The present invention generally relates to a device for providing an indication of the position of a manually operable control member such as a foot pedal, and deals more particularly with a device for providing an operator with a tactile indication that the pedal has been depressed to a pre-selected position, such as a wide open throttle position.

BACKGROUND OF THE INVENTION

In connection with manually operable controls, it is often desirable to provide the operator with a tactile indication of the position of the control. This is often achieved through the use of detents or other mechanical means for producing a mechanical signal which the operator can "feel" through the control. In the case of a foot-operated pedal, such as a throttle pedal on a vehicle, a mechanical signal generator operated by the pedal may be used to provide the operator with an indication that the pedal has been depressed to a "kick-down" or passing gear position. In the past, these kick-down indicators have also functioned to control the vehicle's transmission to shift into a passing gear. More recently, with the adoption of electronically controlled engines, pedal operated switches for controlling the transmission are not always used, although it is nevertheless desirable to provide the driver with a tactile signal that the pedal has been displaced to a passing gear or wide-open throttle position. One prior art approach to providing a mechanical "kick-down feel" (KDF) signal for the throttle pedal is shown in FIGS. 1 A–1C of the accompanying drawings. This prior art KDF is mounted on the rear of a throttle pedal assembly 32 which comprises a pedal 36 mounted on a pedal arm 34 which is journalled for rotation by means of a pivotal mounting assembly 38 carried by a mounting bracket 42. The KDF is mounted on either the vehicle firewall or a vertical backplate 44 forming part of the mounting bracket 42. The KDF comprises a pair of laterally spaced, generally rectangular body portions 10, 12 acting as magnetic body pieces, respectively provided with through holes 22, 24 for mounting the device on the backplate 44. A pair of vertically spaced, rectangular magnets 14, 16 are sandwiched between the body portions 10, 12 and define a through hole 18 therebetween. The upper ends of the body portions 10, 12 are provided with a pair of laterally spaced ears 20 carrying a transverse pin 26 for pivotally mounting the upper end of a displaceable plate 28. The displaceable plate 28 is made of a magnetically attractive material and includes an elongate actuating pin 30 which extends through the hole 18 and is engageable by a rear surface 40 on the pedal 36 to activate the KDF. As best seen in FIG. 1C, the backplate 44 includes a clearance opening 46 to accommodate rearward displacement of the lower end of the displaceable plate 28. In operation, when the pedal 36 is in its normal position, pedal surface 40 is spaced from the outer end of the pin 30 so that the magnets 14, 16 attract the plate 28 to pivot into contact therewith. Upon depression of the pedal 36 to a preselected point at which surface 40 contacts the pin 30, the attractive force of magnets 14, 16 on the plate is overcome, and the plate 28 then "snaps" free to pivot rearwardly as the pedal arm 34 continues to swing slightly to its fully depressed position when pedal stop 43 engages the backplate 44.

The prior art KDF described above, while effective for its intended purpose, is less than completely desirable in terms of the complexity of its construction. Multiple magnets and body portions must be assembled in proper alignment, following which the displaceable backplate 28 must be pivotally mounted on the body and magnet assembly. The pivotal connection is subject to failure, and the use of multiple parts increases the possibility that they may become misaligned or loose, particularly when subjected to the harsh vibrational environment of a vehicle cab.

In view of the above, it is clear that there is a need in the art for an improved KDF device which is simplified in construction and is both easy to manufacture and simple to install.

SUMMARY OF THE INVENTION

According to the invention, a device for providing the operator of a displaceable control with a tactile indication that the control has reached a preselected displacement position of the control includes a one-piece, cup-like housing having a central opening therein, a displaceable member of magnetically attractive material, including an actuating pin journalled for sliding movement within the housing opening, and a ring-shaped magnet disposed within the cuplike housing which includes a central hole through which the pin extends. The device is mounted in proximity to the control which may comprise, for example, a foot throttle pedal, such that depression of the pedal brings a surface of the pedal into contact with the pin. The displaceable member, which is preferably of one-piece construction, is normally biased by the influence of the ringshaped magnet into contact with a surface on the cup-shaped housing, but is displaceable away from the magnet upon engagement of the pin by the pedal to produce a "snap-like" action giving the operator a tactile feel that the pedal has been depressed to a preselected position, such as a passing gear or "kick down" position. The ring-shaped magnet, which is also of one piece construction, is stationarily mounted within a ring-shaped recess in the housing. The housing, in turn, is secured to either the pedal assembly or firewall of the vehicle by means of mounting ears integrally formed on the housing.

The kick-down feel device of the present invention is particularly simple to manufacture and assemble, owing to its three-piece design, and eliminates the need for multiple magnets and pivotal mountings required by prior devices.

BRIEF DESCRIPTION OF THE DRAWINGS

In the drawings, which form an integral part of the specification and are to be read in conjunction therewith, and in which like reference numerals depict identical components in the various views:

FIG. 3 is a view similar to FIG. 1B but showing the KDF device of the present invention installed on a pedal assembly;

FIG. 4 is a fragmentary view taken in a direction of A—A in FIG. 3; and

FIG. 5 is an enlarged, fragmentary view of the assembly shown in FIG. 3, parts of the KDF being broken away in section, and showing the pedal in its fully depressed position.

DESCRIPTION OF THE PREFERRED EMBODIMENTS

Figure 1:
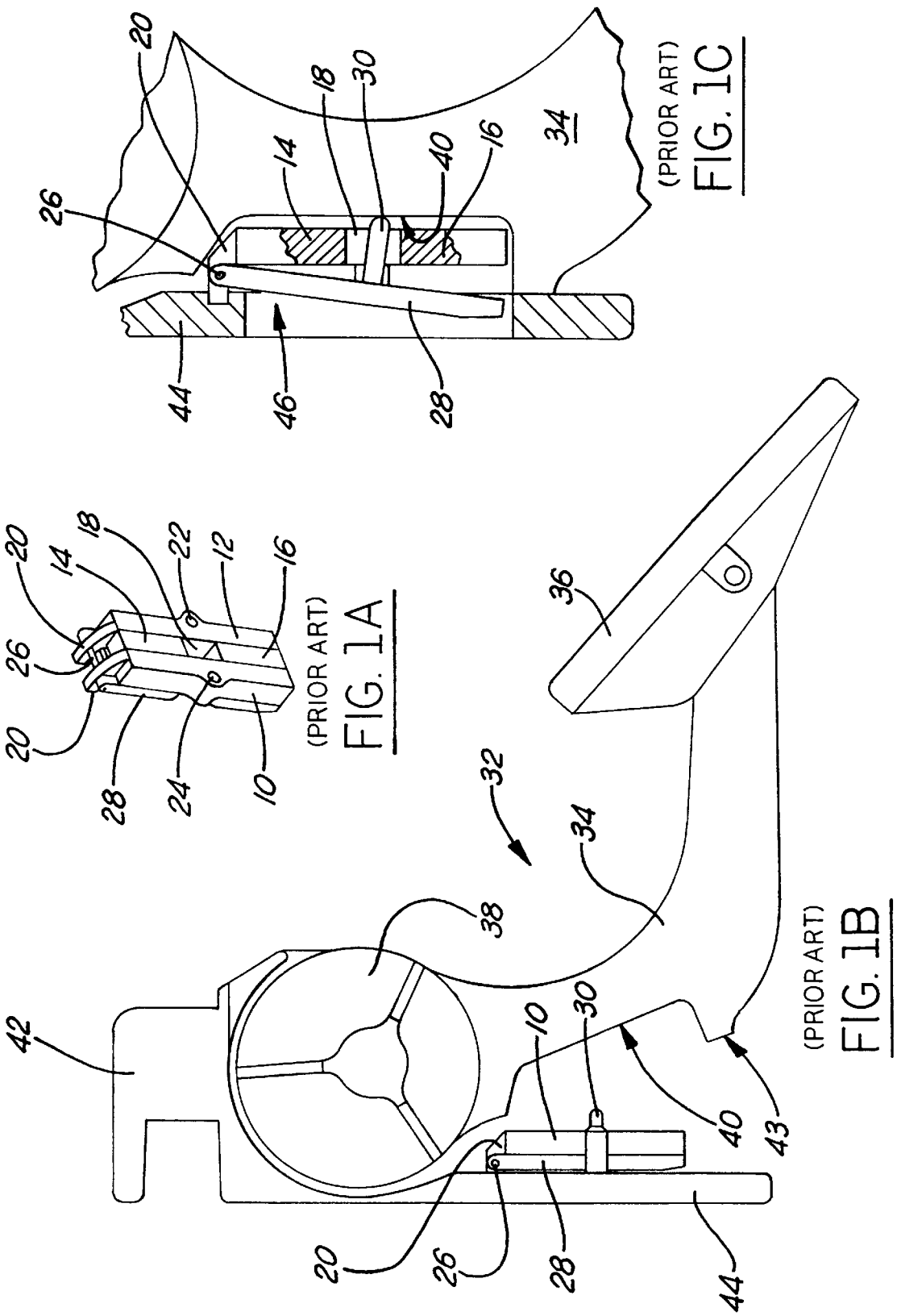
FIG. 1A is a perspective view of a prior art kick-down feel (KDF) device.
FIG. 1B is a side elevational view of a throttle pedal assembly with the prior KDF of FIG. 1A installed thereon.
FIG. 1C is an enlarged, fragmentary side view of the pedal assembly shown in FIG. 1B, with parts broken away in section and the pedal shown in its fully depressed position.
Figure 2:
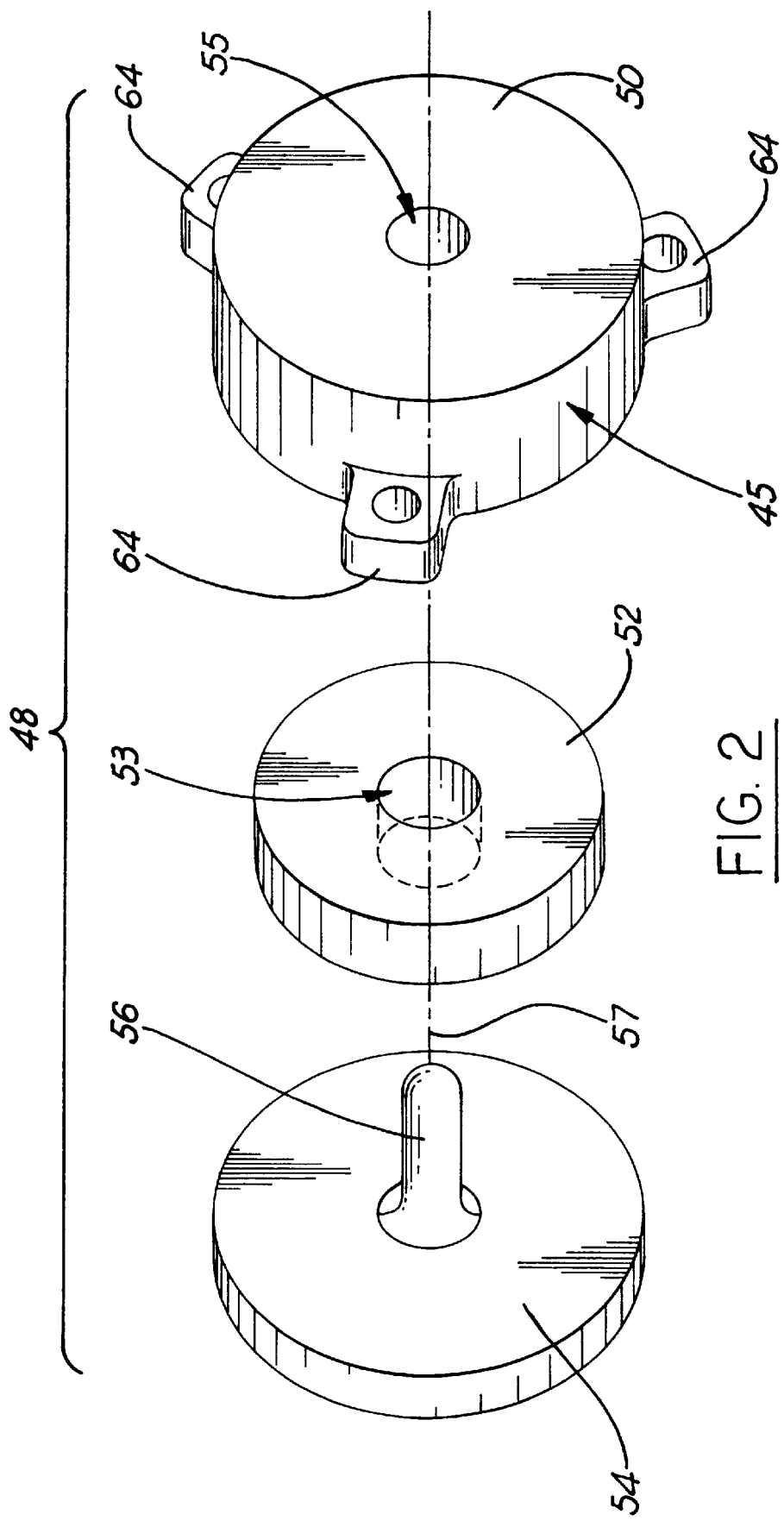
FIG. 2 is an exploded, perspective view of the KDF of the present invention.

Referring now to FIGS. 2–5, the present invention relates to a KDF generally indicated by the numeral 48 in FIG. 2, which broadly comprises a cup-shaped housing 50, a ring-shaped magnet 52 and a displaceable member 54 provided with an actuating pin 56. The housing 50 is of unitary, one-piece construction made, for example, as by casting of a ductile iron. The housing 50 is generally circular in shape and includes three circumferentially spaced mounting flanges 64, each having a through hole for mounting the KDF 48 on a vehicle firewall or a backplate 44 by means of cap screws 66 or the like.

The ring-shaped magnet 52 is received within a ring-shaped recess 62 in the back side of the housing 50. The recess 62 is generally U-shaped in cross section and is defined by inner and outer, radially spaced, circumferential walls 58, 62 formed integral with the outer face of housing 50. The inner circumferential wall 58 essentially functions as a mounting ring which is received closely within a central hole 53 in the ring-shaped magnet 52. The magnet 52 is secured within the recess 62 by an adhesive or any other suitable means.

As best seen in FIG. 5, the width of the outer wall 45 is greater than the width of either the magnet 52 or inner wall 58, and includes a circumferentially extending, outer bearing surface 68 which engages and stops an inner face on the displaceable member 54, thus creating a small air gap 61 between member 54 and the magnet 52 when the KDF 48 is in its normal, unactuated position (See FIG. 3). The displaceable member 54 is in the form of a disk or circular plate of a material, such as ductile iron formed by casting, which is responsive to the magnetic attraction of the magnet 52. The elongate actuating pin 56 is integrally formed with the member 54 and is centrally located on one face of the member 54, such that its longitudinal axis passes through the centers of the through hole 53 in magnet 52 and the opening 55 in housing 50. Actuating pin 56 possesses a circular cross section and is sized to be closely received, but slidable through a bearing in the form of a bushing 60 mounted on the inside face of the inner circumferencial wall 58. The bushing 60 effectively restrains and journals the pin 56 for longitudinal sliding movement, and thus acts to slidably mount the displaceable member 54 on the housing 50.

The KDF 48 is mounted on the back plate 44 such that the actuating pin 56 is aligned with and engageable by a camming surface 40 on the pedal arm 34. In its normal state, when the pedal 34 is not contacting the actuating pin 56, the magnetic force of the magnet 52 draws the inner face of the displaceable member 54 into contact with the bearing surface 68 thereby holding the pin 56 in its fully extended position. When the operator depresses the pedal 36 to a certain position of displacement, camming surface 40 engages the outer end of actuating pin 56, and thereafter, continued pivotal displacement of pedal arm 34 displaces the pin 56 rearwardly, thereby overcoming the attractive force of the magnet 52 and snapping displaceable member 54 free from contact with the bearing surface 68. Guided by the bushing 60, the pin 56 and member 54 continue to move rearwardly into a clearance opening 46 within the backplate 44 until stop shoulder 43 engages the backplate 44, marking the maximum displacement of both the pedal arm 34 and the displaceable member 54.

The snap action of the member 54 breaking free from the influence of the magnet 52 and its seating on bearing surface 68 produces a pronounced tactile shock which is transmitted through the pedal assembly 32 to the operator's foot, thus giving the operator the sense of the pedal having reached a "kick-down" point which is usually at or close to wide-open throttle.

As the operator reduces force on the pedal 36, pedal arm 34 begins moving back to its starting position and magnet 52 urges the member 54 back into engagement with bearing surface 63. This linear movement of the displaceable member 54 along the common axis 57 is guided by the actuating pin 56 as it slides linearly through the bushing 60.

From the foregoing, it may be appreciated that the present invention provides for the reliable accomplishment of the objects in the invention, and does so in a particularly simple and effective manner. The KDF device of the present invention is especially economical to manufacture and trouble-free in operation since it is constructed of essentially three relatively simple parts which are assembled without the need for fasteners or pivotal connections. The present KDF is also less subject to failure because of exposure to environmental contaminants. The inventive KDF is well adapted for use with foot pedals employed for example in vehicles, but may find use with other manually operated control elements, such as hand operated control levers. Many equivalents and variations are contemplated within the scope of the invention. For example, the bushing 60 may be formed integral with the housing 50 or it could be defined as part of the magnet 52. Also, the magnet could be mounted on the displaceable member 54, rather than on the housing 50 as shown in the drawings. Accordingly, the protection sought and to be afforded hereby should be deemed to extend to the subject matter claimed and all equivalents thereof fairly within the scope of the invention.

I claim:

1. A device for providing the operator of a displaceable control with a tactile indication that the control has been displaced to a preselected position of the control, comprising:
    a housing having an opening therein;
    a displaceable member of magnetically attractive material;
    an actuating pin on said displaceable member and passable through said opening; and
    a ring-shaped magnet disposed within said housing and having a hole therein surrounding said opening in said housing, said displaceable member being shiftable upon engagement of said pin by said control from a first, normal position in proximity to said magnet and a second, displaced position wherein the magnetic attraction of said member to said magnet is reduced, the displacement of said member providing the operator with tactile indication of said preselected control position.

2. The device of claim 1, wherein said housing includes a ring-shaped recess possessing a generally U-shaped cross section.

3. The device of claim 1, wherein said opening in the said housing is defined by a generally cylindrical, integrally formed inner wall, said wall passing through said hole in said magnet.

4. The device in claim 1, wherein said housing includes an outer wall surrounding the outer periphery of said magnet.

5. The device of claim 1, wherein said pin is integrally formed with said displaceable member.

6. The device of claim 1, wherein said housing is a single magnetic pole piece.

7. The device of claim 6, wherein said housing is generally circular and said opening passes centrally through said housing.

8. The device of claim 1, wherein said magnet is of single piece construction.

9. The device of claim 6, wherein said magnet is of single piece construction.

10. The device of claim 9, wherein said displaceable member and pin are integrally formed to define a single piece.

11. The device of claim 1, wherein:

said housing includes an outer circumferential wall surrounding said magnet, and said wall includes an edge engageable with said displaceable member and acting as a stop to limit the movement of said displaceable member toward said magnet.

12. The device of claim 1, wherein said housing, said magnet and said displaceable member are each of generally circular shape.

13. A foot pedal position indicating device, comprising:

a one-piece magnet having an opening therethrough;

structure for mounting said magnet in a stationary position adjacent said pedal;

a displaceable member formed of a material attractive to said magnet, said displaceable member including a portion extending through said opening and engageable by said pedal, said displaceable member being displaceable from a first position to a second position upon movement of said pedal to provide a pedal operator with a tactile indication that the pedal has been shifted to a particular position.

14. The device of claim 13, wherein:

said structure includes a housing having a ring-shaped recess therein, and said magnet is ring-shaped and is received within said recess.

15. The device of claim 14, wherein said housing includes a circumferential stop surface engageable with said displaceable member to hold said displaceable member in closely spaced relationship to said magnet when said displaceable member is in said first position thereof.

16. The device of claim 13, wherein said opening in said magnet has a central axis, and said displaceable member moves linearly along said central axis when said member is shifted from said first position to said second position thereof.

17. The device of claim 13, wherein said opening has a central axis and said magnet, said mounting structure and said displaceable member are symmetric about said central axis.

18. A device for giving an operator a tactile indication that a foot pedal has reached a preselected, depressed position, comprising:

a cup stationarily mountable adjacent said pedal;

a magnet mounted within said cup;

said cup and said magnet each having an opening therein aligned along a common axis, a displaceable member including a portion extending through the openings in said cup and said magnet, said displaceable member being linearly displaceable along said common axis when said pedal reaches said preselected position from a first position in which the amount of magnetic attraction of said magnet to said member is relatively high to a second position in which the amount of said magnetic attraction is relatively low.

19. The device of claim 18, wherein said cup, said magnet and said displaceable member are each of unitary, one piece construction.

20. The device of claim 18, wherein said cup, said magnet and said displaceable member are symmetric about said common axis.

21. A foot pedal position indicating device, comprising:

a first stationary portion adapted to be stationarily mounted adjacent said pedal;

a second, moveable portion including an actuating pin engageable by said pedal, said moveable portion being moveable between first and second position upon engagement of said pin by said pedal;

magnetic means carried by one of said first and second portion for exerting a biasing influence on the other; and structure for mounting said second portion for linear movement on said first portion along the longitudinal axis of said actuating pin.

22. The device of claim 21, wherein said magnetic means is secured to said first portion and said second portion is formed of a material magnetically attracted to said magnetic means.

23. The device of claim 22, wherein said magnetic means is defined by a ring-shaped magnet, and said pin extends through said magnet.

24. The device of claim 23, wherein said pin is journalled for sliding linear movement within said magnet.

25. The device of claim 21, wherein said mounting structure includes a bearing carried on said magnetic means, and said pin is journalled for linear sliding movement within said bearing.

* * * * *